(12) United States Patent
Mahmood et al.

(10) Patent No.: US 9,336,499 B2
(45) Date of Patent: *May 10, 2016

(54) PREVIEW RELATED ACTION LIST

(75) Inventors: Khurram Mahmood, Walnut Creek, CA (US); Michael Bonadio, Alamo, CA (US); Lance Christmann, Albany, OR (US)

(73) Assignee: Workday, Inc., Pleasanton, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 13/088,274

(22) Filed: Apr. 15, 2011

(65) Prior Publication Data

US 2011/0197138 A1 Aug. 11, 2011

Related U.S. Application Data

(63) Continuation of application No. 11/881,744, filed on Jul. 27, 2007, now Pat. No. 7,958,459.

(51) Int. Cl.
*G06Q 10/00* (2012.01)
*G06F 3/048* (2013.01)
*G06F 3/0484* (2013.01)

(52) U.S. Cl.
CPC ............... *G06Q 10/00* (2013.01); *G06F 3/048* (2013.01); *G06F 3/0484* (2013.01)

(58) Field of Classification Search
CPC . G06Q 10/06; G06Q 10/105; G06Q 10/1053; G06Q 10/1057; G06Q 10/06311; G06F 3/0481–3/0489
USPC .................. 715/808, 809, 810, 705
See application file for complete search history.

(56) References Cited

U.S. PATENT DOCUMENTS

| | | | | |
|---|---|---|---|---|
| 6,049,776 | A * | 4/2000 | Donnelly et al. | 705/7.14 |
| 6,160,554 | A * | 12/2000 | Krause | 715/804 |
| 6,401,079 | B1 * | 6/2002 | Kahn et al. | 705/30 |
| 7,587,392 | B2 * | 9/2009 | Jhaveri et al. | |
| 7,958,147 | B1 * | 6/2011 | Turner et al. | 707/783 |
| 2002/0169876 | A1 * | 11/2002 | Curie et al. | 709/226 |
| 2002/0184148 | A1 * | 12/2002 | Kahn et al. | 705/40 |
| 2002/0194045 | A1 * | 12/2002 | Shay et al. | 705/8 |
| 2003/0028412 | A1 * | 2/2003 | Hoffman et al. | 705/10 |
| 2003/0149660 | A1 * | 8/2003 | Canfield | 705/39 |
| 2003/0216957 | A1 * | 11/2003 | Florence et al. | 705/11 |
| 2004/0138903 | A1 * | 7/2004 | Zuniga | 705/1 |
| 2004/0254805 | A1 * | 12/2004 | Schwerin-Wenzel et al. | 705/1 |
| 2005/0028158 | A1 * | 2/2005 | Ferguson et al. | 718/100 |
| 2005/0125509 | A1 * | 6/2005 | Ramachandran | 709/220 |
| 2006/0041623 | A1 * | 2/2006 | Danninger | 709/206 |
| 2006/0047797 | A1 * | 3/2006 | Brown et al. | 709/223 |

(Continued)

*Primary Examiner* — Steven B Theriault
(74) *Attorney, Agent, or Firm* — Van Pelt, Yi & James LLP

(57) ABSTRACT

Previewing content included in an enterprise database associated with an enterprise system is disclosed. A first indication is received for an overlay object associated with an object from the enterprise database that is being displayed. an action list is dynamically determined associated with the object being displayed using a first method to retrieve actions from the enterprise system that are associated with the object being displayed. The action list is provided to the overlay object. Content associated with the object is dynamically determined using a second method to retrieve content from the enterprise system. The content is provided to the overlay object. The overlay object is displayed to preview the content included in the enterprise database and to provide the action list.

24 Claims, 4 Drawing Sheets

(56) References Cited

U.S. PATENT DOCUMENTS

| | | | |
|---|---|---|---|
| 2006/0048068 A1* | 3/2006 | Danninger | 715/769 |
| 2007/0028175 A1* | 2/2007 | Moore et al. | 715/733 |
| 2007/0073776 A1* | 3/2007 | Kalalian et al. | 707/104.1 |
| 2008/0005247 A9* | 1/2008 | Khoo | 709/206 |
| 2008/0040149 A1* | 2/2008 | Joao | 705/1 |
| 2008/0235603 A1* | 9/2008 | Holm et al. | 715/762 |
| 2008/0270948 A1* | 10/2008 | Lazzaro et al. | 715/854 |
| 2009/0125896 A1* | 5/2009 | Chessell et al. | 717/168 |
| 2009/0138808 A1* | 5/2009 | Moromisato et al. | 715/758 |
| 2009/0216869 A1* | 8/2009 | Kennedy | 709/223 |
| 2012/0151311 A1* | 6/2012 | Mathai et al. | 715/205 |

* cited by examiner

PREVIEW RELATED ACTION LIST

CROSS REFERENCE TO OTHER APPLICATIONS

This application is a continuation of U.S. patent application Ser. No. 11/881,744, entitled PREVIEW RELATED ACTION LIST filed Jul. 27, 2007 and issued as U.S. Pat. No. 7,958,459 which is incorporated herein by reference for all purposes.

BACKGROUND OF THE INVENTION

Navigating and interacting with a system that includes many stored objects can be cumbersome. Specifically, in some cases in order to perform an action associated with an object, the object must first be viewed (as it is represented using a graphical user interface) and a menu item must be selected indicating an action associated with the viewed object. Loading the object from another associated object page—for example, loading a specific worker from a directory listing page—may take a significant amount of time given the size of a data base and the interconnection data transfer rate between a server and a user. Also, locating relevant actions in menus and/or relevant information in an entire object as displayed for an object may be time consuming as well depending on the number of menus, the number of menu levels, the amount of information displayed for the object, etc.

BRIEF DESCRIPTION OF THE DRAWINGS

Various embodiments of the invention are disclosed in the following detailed description and the accompanying drawings.

DETAILED DESCRIPTION

Figure 1:
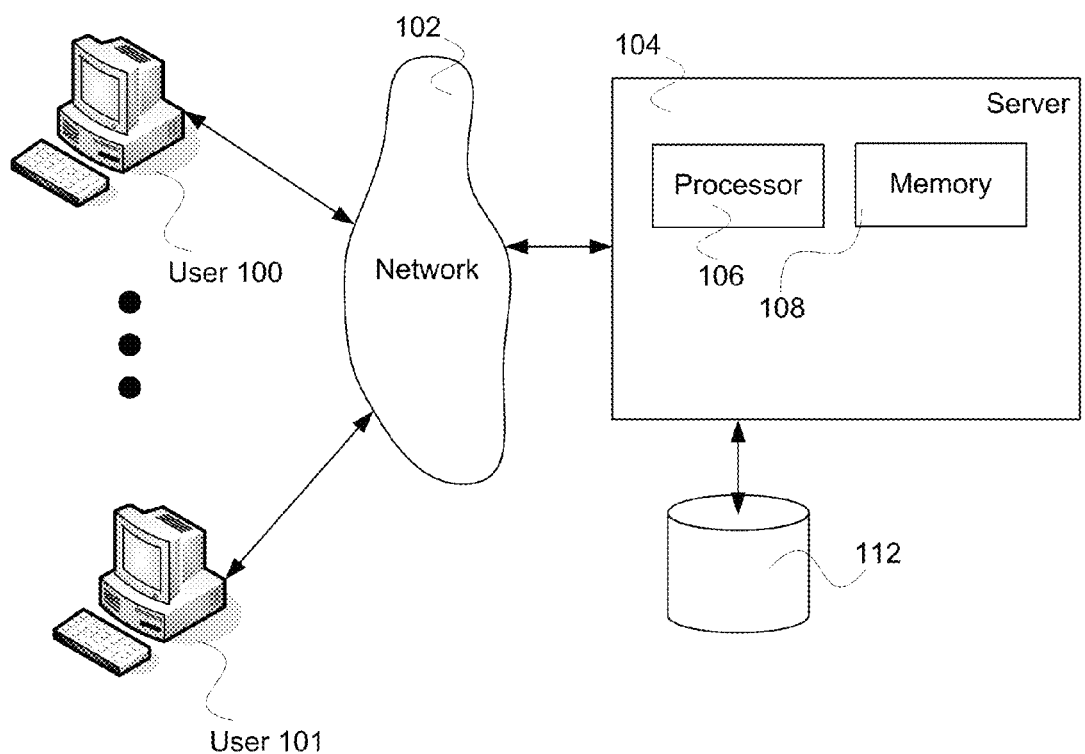
FIG. 1 is a block diagram illustrating an embodiment of a system including a preview related action list.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Previewing content included in an enterprise database associated with an enterprise system is disclosed. A preview is displayed as an overlay to a user in a window. The overlay includes content associated with an object. The object is an object stored by the system. The content is a summary of the object, a subset of the content associated with the object, statistics (e.g., a total number of employees of a company object), a graph summarizing information related to the object, an image (e.g., a photo of a worker), or any other information that may help a user understand the nature of the object. The content is dynamically retrieved from a system storage database or other storage. In some cases, the content is associated with objects associated with the object for which the indication to preview was received. The overlay includes an action list. The action list is dynamically determined. The action list comprises a list of actions that can be executed with regard to the object. Actions can include generating a report, initiating a process, navigating and displaying content to the user, or any other appropriate action associated with the object. The content and/or the action list can be made dependent on the user, the user's role/authorizations/privileges, the object, the instance of the object, the class of the object, the state of the object, or any other appropriate parameter or system value.

In various embodiments, the system with a preview and related action list comprises an enterprise software system such as a human resource system, a customer management system, business process system, etc. For example, a human resource system includes objects associated with organization (e.g., a company), workers, and locations. A display of an organization includes a list of locations. Each location can be previewed by clicking an indication symbol or holding a cursor over the location name (or saying the location name into a microphone). The preview displays a summary of the location including the total number of employees, the address, the physical plant size, etc. The content is associated with the object or objects related to the object. In some embodiments, the object is linked to other objects, where every object is stored as part of the system. An action list is also displayed. The action list includes entries such as 'display directions', 'phone location', 'display location directory', etc. In some embodiments, the preview is dependent on the user's role—for example, a financial officer may also see a summary statistic showing monthly revenue generated at the site as well as physical plant cost. In some embodiments, the content is dependent on the object—for example, all location objects have an associated image of the front of the building on the location and this is displayed for the preview. In some embodiments, the action list is dependent on the user—for example, a procurement manager's action list might include an action item list 'order building supplies' or 'report site inventory'.

In some embodiments, the preview and/or action list determination is determined using a method defined on a class. The method can be defined at the time of creation of the class or later. The method can be defined by a developer or, in some cases, by an administrator, super user, or the user. In some embodiments, the method indicates the content associated with the object or associated with objects linked to the object that needs to be retrieved and/or processed for the preview.

FIG. 1 is a block diagram illustrating an embodiment of a system including a preview related action list. In the example shown, server 104 includes processor 106, and memory 108. Server 104 is coupled to external storage 112 so that server 104 is able to store information to and access information from external storage 112. Server 104 is also coupled to network 102. In various embodiments, network 102 comprises one or more of the following: a local area network, a wide area network, a wired network, a wireless network, the Internet, or any other appropriate network. Network 102 enables a plurality of users, represented in FIG. 1 by user 100 and user 101, to access server 104.

In some embodiments, the application dynamically derives permissions using one or more rules by deriving the permissions in real-time from enterprise data associated with user 100 or user 101, with a role, with an instance of an object being accessed, with a class of object being accessed, with a state associated with an object being accessed, with a process associated with an object being accessed, or any other appropriate user, process, object related permissions. In various embodiments, server 104 is implemented using multiple physical pieces of hardware including multiple processors for processor 106 and multiple memories for memory 108. In various embodiments, server 104 includes one or more devices for internal storage instead of or in addition to one or more external storage devices (e.g., external storage 112) for storing data associated with the human resources system.

Figure 2:
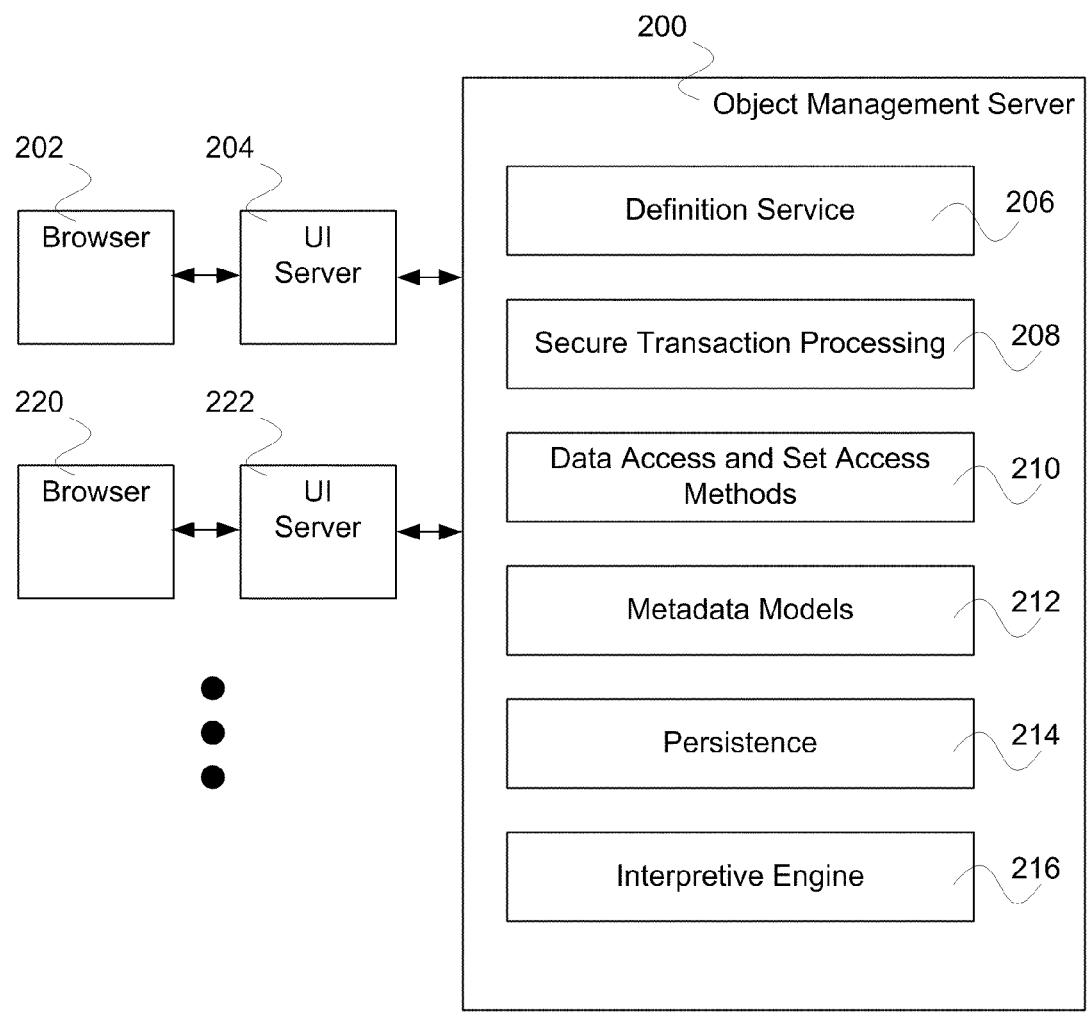
FIG. 2 is a block diagram illustrating an embodiment of software for a system including a preview related action list.

FIG. 2 is a block diagram illustrating an embodiment of software for a system including a preview related action list. In some embodiments, the software of FIG. 2 is executed on the system of FIG. 1. In the example shown, browser 202 interacts with user interface (UI) server 204. UI server 204 renders a user pleasing interface for a human user to the system (e.g., object management server). In some embodiments, browser 202 is executing on a user computer such as user 100 of FIG. 1 that interacts with a user interface server such as server 104 of FIG. 1. UI server 204 interacts with object management server 200. In various embodiments, UI server 204 and object management server 200 are implemented using a single server—for example server 104 of FIG. 1—or using multiple servers (not shown in FIG. 1). Object management server includes definition service 206, secure transaction processing 208, data access and set access methods 210, metadata models 212, persistence 214, and interpretive engine 216. In various embodiments, user interacting with browser 202 is developing and/or executing a human resources system that is hosted by object management server 200.

Definition service 206 is used to define the human resources system, a financials system, or any other enterprise system. Definitions include definitions of metadata models and definitions of processing. Definition service 206 can test new definitions and changes to definitions by executing definitions using interpretive engine 216.

Secure transactional processing 208 is used to process transactions requested by a user. Transactions as units of work are queued, processed, and committed. The processing of a unit of work includes validation, locating a controlling object, performing updates and related updates, and building a response.

Data access and set access methods 210 is used to access, combine, select, filter instances and sets of instances (e.g., instances with relationships and/or work sets) as well as set and retrieve attribute(s) of an instance.

Metadata models 212 includes objects that store base metadata including classes, methods, and relationships, enterprise system metadata such as human resources metadata, and the customer metadata including classes, methods, and relationships.

Persistence 214 is used to store system objects including data in metadata models and the definitions of metadata models themselves. Objects are stored in tables including an instance table, an attribute table, and a reference table. The tables are designed to store data that has been specified; empty values are not stored in the tables. The data is encrypted and only accessible by object management server 200. In some embodiments, the tables storing the system objects are all loaded into memory of the system when the system is executing. System objects are stored in a system database that enables access to objects for retrieval and other database manipulation.

Interpretive engine 216 is used to execute the system including a preview with related action list by interpretively processing metadata models 212 and processes. Processes include processes associated with definition service 206, secure transaction processing 208, data access and set access methods 210, and persistence 214. Interactive engine 216 when processing the defined metadata models (e.g., metadata models 212) and defined processes is sufficient to be a fully functional system that includes a preview with related action list. The fully functional system is capable of providing the functionality required by a user and/or requestor. In some embodiments, the system comprises a human resource system with functionality including one or more of the following functions: tracking employee histories, data, skills, experiences, positions, salaries, managers, attendance, vacation time, sick leave time, payroll deductions, health benefits, stock or stock option benefits, insurance benefits, pension benefits, profit sharing benefits, etc., issuing payroll checks or instructions, processing travel reimbursement, benefit enrollment, tracking training or professional development, or any other appropriate functionality for human resource management. In some embodiments, the system comprises a financials system with functionality including one or more of the following functions: accounts payable, accounts receivable, general ledger, financial statements, resource management, revenue management, or any other appropriate functionality for financials management. In some embodiments, the system comprises an enterprise system with functionality including customer relation management (e.g., appointment tracking, contact tracking, etc.), business process management (e.g., from processing, approval processing, development tracking, etc.), content management, or any other appropriate enterprise system functionality.

Figure 3:
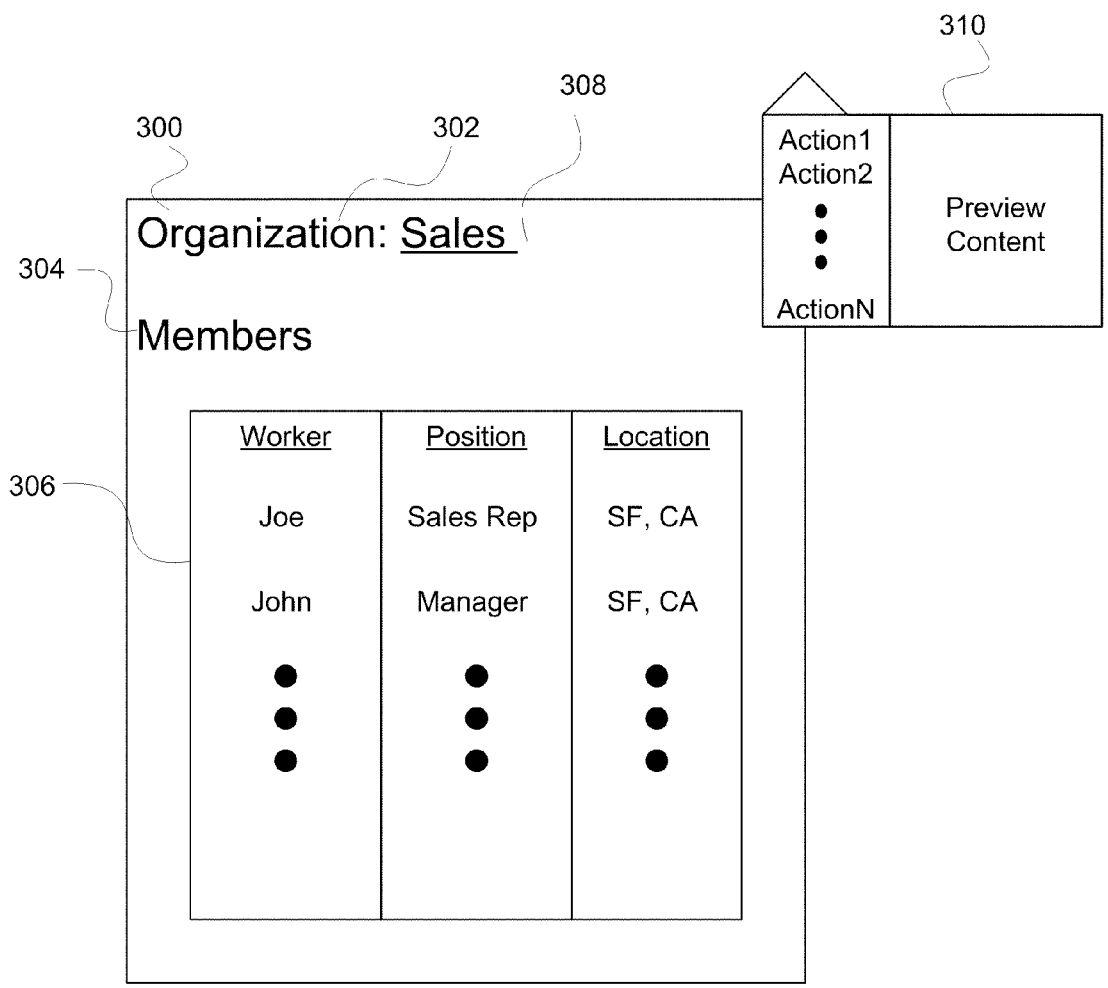
FIG. 3 is a block diagram illustrating an embodiment of a user interface graphic display including a preview with a related action list.

FIG. 3 is a block diagram illustrating an embodiment of a user interface graphic display including a preview with a related action list. In the example shown, user interface graphic display 300 includes title 302 (i.e., 'Organization: Sales'), subtitle 304 (i.e., 'Members'), and table 306. Table 306 includes headings (e.g., 'worker', 'position', and 'location') and table entries (e.g., 'Joe', 'Sale Rep', 'SF, CA', etc.). User interface graphic display 300 also includes a plurality of preview activation symbols (e.g., '▼'), such as symbol 308. When a user clicks or hovers over a preview activation symbol, a preview window, or display overlay such as display overlay 310, is displayed. The object associated with the preview window comprises an object that is stored in the system. Display overlay 310 includes an action list and preview content. The action list is a list of actions associated with the object associated with the preview window (e.g., display overlay 310 is associated with symbol 308 which is associated with the object associated with 'Sales'). The actions listed in action list depend on the state of the associated object or instance of the object, the user that clicks or hovers over the preview activation symbol, the user's privileges/associated roles/authorizations with respect to the associated object or instance of the object, the object class, the object instance, the security properties of the object/class of objects/instance of the object, a process associated with activation of the preview, or any other appropriate manner for determining appropriate actions for an action list. In some embodiments, a user is granted an authorization from another user with greater privileges on a system. In some embodiments, a role has associated privileges that are used in determining an action list. In various embodiments, a role comprises a manager, a supervisor, a vice president, an executive, a board member, a super user, a visitor, a guest, a staff person, a temporary worker, etc. In some embodiments, action list is determined dynamically or at the time of indicating that a preview or overlay is desired including, but not limited to, determining appropriate authorizations/security/object dependencies.

The preview content of display over 310 can include a subset of object content, a picture, a graph, a summary graph, a statistic, an aggregated statistic, text information, an abstract, links, contact information (e.g., an email address, an instant messaging identifier, a phone number, etc.), or any other appropriate content for a preview of an object.

Preview content is designed to offer a summary view of the object. The preview enables a user to view a compact version of the information present in the object in order to help the user to decide if the user would like to perform an action with respect to the previewed object as appears in the action list or to view the entire object. In various embodiments, the user can also indicate an item in the preview that launches an appropriate process or application. For example, a click on an email address would launch an email program and open a compose window with the email address filled in; a click on an instant messaging identifier would launch a messaging program to open a window for messaging; a click on a web link would launch a web browser and open a window for the web site associated with the web link, or a click on a phone number would launch a telephonic application to open a telephone connection (e.g., a Skype™ call or other VoIP call) with the phone number selected.

Figure 4:
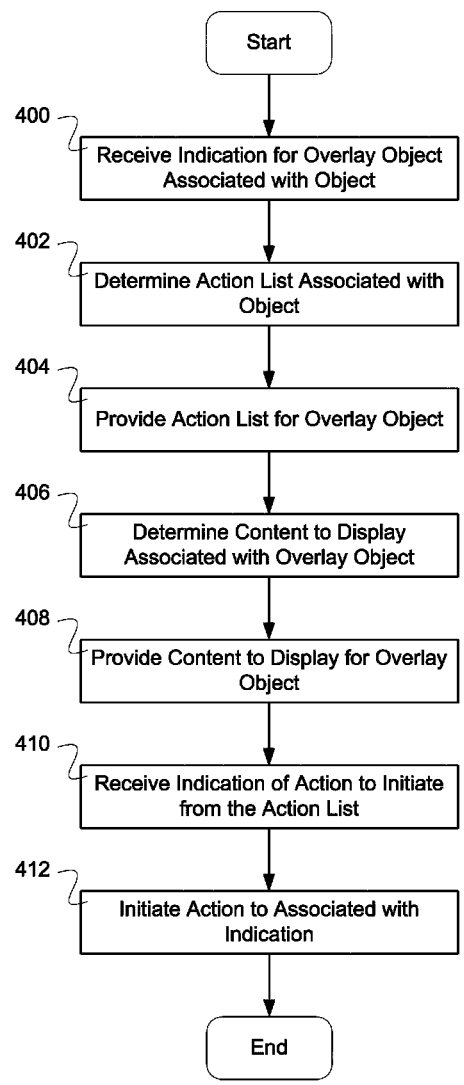
FIG. 4 is a flow diagram illustrating an embodiment of a process for a system including an action list related to preview.

FIG. 4 is a flow diagram illustrating an embodiment of a process for a system including an action list related to preview. In the example shown, in 400 an indication is received for an overlay object associated with an object. An overlay object (e.g., a preview) is indicated using a click or hovering over a preview symbol associated with an object. In various embodiments, the click or hovering is over a word or image associated with the object. In various embodiments, the indication is indicated using a voice command or other human-computer interaction device or manner. In 402, an action list is determined associated with the object. The determination of the action list is based on the user indicating to see the preview, the state of the instance of the object (e.g. an instance of the class 'position' can be open, filled, closed, frozen, etc.), the user's associated privileges/authorizations/roles (e.g. a user can have roles such as Manager, HR Partner, Recruiter, System Administrator; A role can have authorization to view, add, edit or delete data in the system), the object's class (e.g., classes in the system include Position, Organization, Business Site, Worker, Employee, Applicant, Event, etc.), or any other appropriate manner of selecting an action list.

For example, a human resource director or a receptionist navigates to a page with a worker's object displayed. The human resource director hovers over a preview symbol associate with the worker's object is able to see an action list associated with the worker including changing withholding, terminating, viewing vacation time available, contact by phone, contact using email, and view emergency contact information. The receptionist hovers over a preview symbol with a worker's object displayed and is able to see an action list associated with the worker including contact by phone. In some embodiments, the action list is dynamically determined and retrieved at run-time using a process that interrogates the appropriate or authorized actions for the user and the object or instance of the object. In some embodiments, a method associated with the object is used to help determine the action list. The method is defined when the object is defined or later by a user, super user, administrator, or developer.

In 404, the action list is provided for the overlay object. The overlay object is displayed using a web browser for the user. In some embodiments, an object management server provides extensible markup language (XML) information to a user interface server enabling the display in a graphical manner of the action list.

In 406, content is determined to display associated with the overlay object. Content for the overlay object (e.g., a preview window) comprises a summary, a subset of associated object instance content, a graphic, an image, an aggregated statistic, public information, private/privileged information, or any other appropriate content for an overlay object is determined based on a preview display method associated the object. In various embodiments, the preview display method is defined when the object is created, when a user or system administrator customizes the preview display, or at any other appropriate time. In various embodiments, the preview display content determination is based at least in part on the user's authorizations/privileges/roles (e.g. a user can have roles such as Manager, HR Partner, Recruiter, System Administrator; A role can have authorization to view, add, edit or delete data in the system), the object's or instance of the object's state (e.g. an instance of the class position can be open, filled, closed, frozen, etc.), the object class (e.g., classes in the system include Position, Organization, Business Site, Worker, Employee, Applicant, Event, etc.), or any other appropriate manner of determining the preview display content.

In some embodiments, the preview content is dynamically determined and retrieved at run-time from a system storage device or database. In some embodiments, the content is associated with an object associated with the object for which a preview of content was indicated. In some embodiments, a method associated with the object for which a preview of content was indicated is used to determine the content for previewing. In some embodiments, the method defines the content to retrieve from storage or database and the processing (e.g., summarizing, aggregating, selecting, graphing, charting, traversing object relationships, etc.) required for the content to be previewed. The method is defined when the object is defined or later by a user, super user, administrator, or developer.

In 408, the content to display is provided for the overlay object. In some embodiments, the content for the overlay object (e.g., the preview) is displayed for a user via a web browser where the web browser receives information from a user interface server. The user interface server transforms XML instructions to a viewable representation. In some embodiments, the viewable representation can be an action script, a java script or any other appropriate user interface language.

In 410, an indication is received to initiate an action from the action list. An action is selected from the list by clicking using a mouse or by selecting using the keyboard. In 412, the action associated with the indication is initiated. In various embodiments, the action includes navigating to a web link, and/or processing and displaying a new graphic on a user interface. In various embodiments, an alternate/new/or other object is displayed, a requested report is displayed, and/or a process is launched (e.g., a phone, email, instant messaging application).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for previewing content included in an enterprise database associated with an enterprise system comprising:
    a processor executing instructions comprising:
        provide a display of objects in the enterprise database;
        receive a first indication from a user to display a preview associated with a selected object stored in the enterprise database;
        dynamically determine an action list associated with the selected object including by using a first method to retrieve, from the enterprise system, actions that are executed with respect to the selected object, wherein the first method includes a run-time determination and retrieval of the action list based at least in part on one or more attributes associated with the user, wherein one of the one or more attributes associated with the user comprises a user role;
        dynamically determine content associated with the selected object using a second method to retrieve content from the enterprise system, wherein retrieving content comprises selecting a subset of information of the selected object to provide summary information of the selected object based on the user role and security permissions of the user, wherein the second method to retrieve content further comprises a method associated with the selected object, wherein the second method further comprises a processing step of the subset of information of the selected object, wherein the processing step comprises traversing object relationships from the selected object to find and provide the summary information; and
        provide the content and the action list for display side by side in the preview, wherein the preview is an overlay; and
    a non-transitory memory coupled with the processor and configured to provide the processor with instructions.

2. The system as in claim 1, wherein the first indication comprises a click.

3. The system as in claim 1, wherein the processing step further comprises selecting the subset of information from available information associated with the selected object.

4. The system as in claim 1, wherein the one or more attributes associated with the user includes an authorization associated with the user.

5. The system as in claim 4, wherein the authorization associated with the user includes authorization to perform at least one of the following: view, add, edit, and delete data stored in the enterprise database.

6. The system as in claim 1, wherein the one or more attributes associated with the user includes a privilege associated with the user.

7. The system as in claim 1, wherein determining the action list is further based at least in part on a state associated with the selected object associated with the first indication.

8. The system as in claim 1, wherein determining the action list is further based at least in part on a class associated with the selected object associated with the first indication.

9. The system as in claim 8, wherein the class associated with the selected object comprises one of the following: position, organization, business site, worker, employee, applicant, and event.

10. The system as in claim 1, wherein providing the action list comprises enabling displaying the action list for the user.

11. The system as in claim 1, wherein the action list includes at least one of the following: change withholding, terminate employment, view vacation time available, contact by phone, contact by email, view emergency contact information, order supplies, report inventory, display directions, and display directory.

12. The system as in claim 1, wherein the processing step further comprises a graphing step of the subset of information.

13. The system as in claim 1, wherein determining the content to display includes an aggregated statistic of content associated with the selected object.

14. The system as in claim 1, wherein determining the content to display includes a graph of content associated with the selected object.

15. The system as in claim 1, wherein determining the content to display is based at least in part on an authorization associated with the user.

16. The system as in claim 1, wherein determining the content to display is based at least in part on a role associated with the user.

17. The system as in claim 1, wherein determining the content to display is based at least in part on a privilege associated with the user.

18. The system as in claim 1, wherein determining the content to display is based at least in part on a state associated with the object associated with the first indication.

19. The system as in claim 1, wherein determining the content to display is based at least in part on a class associated with the object associated with the first indication.

20. The system as in claim 1, wherein the role associated with the user is one of the following: manager, supervisor, vice president, board member, super user, visitor, guest human resource partner, recruiter, system administrator, staff personnel, and temporary worker.

21. The system as in claim 1, wherein the processing step further comprises a charting step of the subset of information associated with the selected object.

22. The system as in claim 1, wherein the processing step further comprises an aggregating step of the subset of information.

23. A method of previewing content included in an enterprise database associated with an enterprise system comprising:
    providing a display of objects in the enterprise database;
    receiving, from a user, a first indication to display a preview associated with a selected object stored in the enterprise database;
    dynamically determining, using a processor, an action list associated with the selected object including by using a first method to retrieve, from the enterprise system, actions that are executed with respect to the selected object, wherein the first method includes a run-time determination and retrieval of the action list based at least in part on one or more attributes associated with the user, wherein one of the one or more attributes associated with the user comprises a user role;

dynamically determining content associated with the selected object using a second method to retrieve content from the enterprise system, wherein retrieving content comprises selecting a subset of information of the selected object to provide a summary of the selected object based on the user role and security permissions of the user, wherein the second method to retrieve content further comprises a method associated with the selected object, wherein the second method further comprises a processing step of the subset of information of the selected object, wherein the processing step comprises traversing object relationships from the selected object to find and provide the summary information; and providing the content and the action list for display side by side in the preview, wherein the preview is an overlay.

24. A non-transitory computer readable storage medium storing computer instructions for:
providing a display of objects in an enterprise database;
receiving, from a user, a first indication to display a preview associated with a selected object stored in the enterprise database;
dynamically determining an action list associated with the selected object including by using a first method to retrieve, from the enterprise system, actions that are executed with respect to the selected object, wherein the first method includes a run-time determination and retrieval of the action list based at least in part on one or more attributes associated with the user, wherein one of the one or more attributes associated with the user comprises a user role;
dynamically determining content associated with the selected object using a second method to retrieve content from the enterprise system, wherein retrieving content comprises selecting a subset of information of the selected object to provide summary information of the selected object based on the user role of the user, wherein the second method to retrieve content further comprises a method associated with the selected object, wherein the second method further comprises a processing step of the subset of information of the selected object, wherein the processing step comprises traversing object relationships from the selected object to find and provide the summary information; and
providing the content and the action list for display side by side in the preview, wherein the preview is an overlay.

* * * * *